Jan. 31, 1939. W. A. GROSS 2,145,543
SAFETY DEVICE FOR MOTOR VEHICLES
Filed Aug. 9, 1937
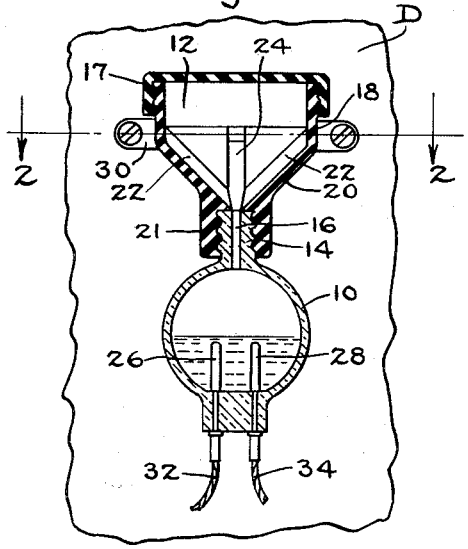
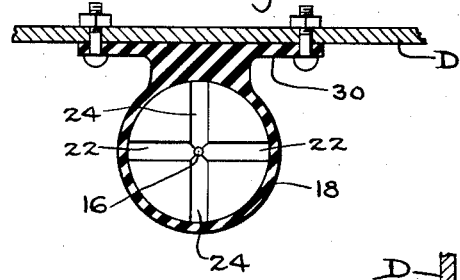
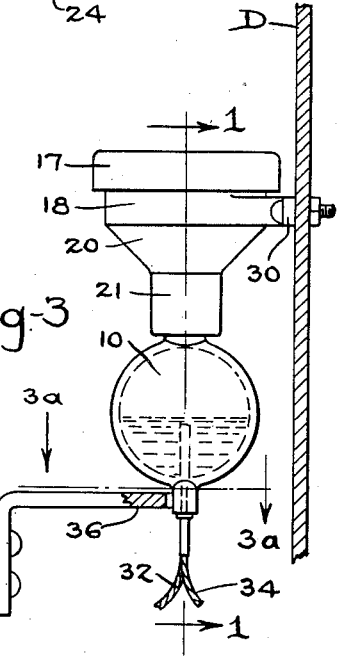
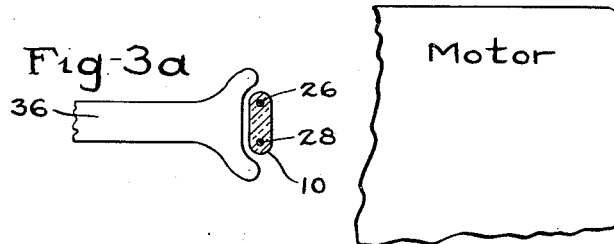
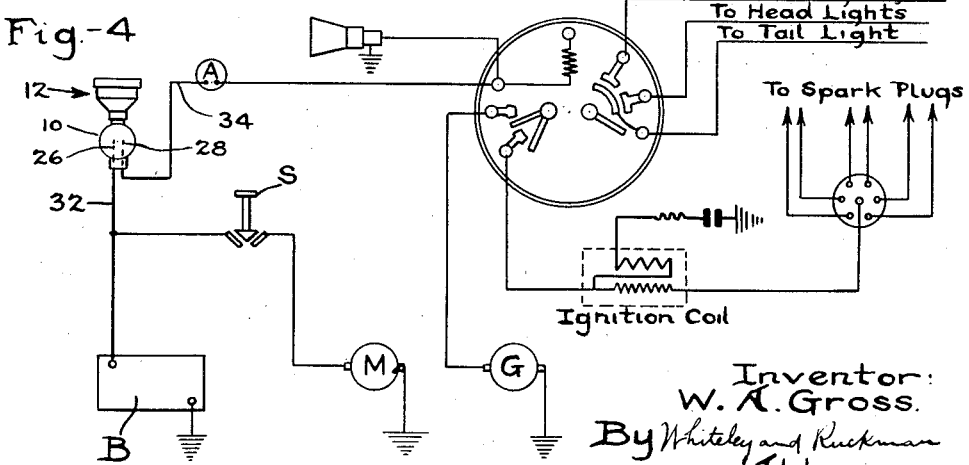
Inventor:
W. A. Gross.
By Whiteley and Ruckman
Attorneys.

Patented Jan. 31, 1939

2,145,543

UNITED STATES PATENT OFFICE 2,145,543

SAFETY DEVICE FOR MOTOR VEHICLES

William A. Gross, Janesville, Wis.

Application August 9, 1937, Serial No. 158,020

3 Claims. (Cl. 200—52)

My invention relates to safety devices for motor vehicles. It relates particularly to such devices for use on vehicles driven by internal combustion engines. In this particular, the term "vehicle" is to be considered as applying to various kinds of automobiles and trucks. Moreover the device may be employed to advantage with airplanes not used for stunt flying such as looping the loop in which case the device would cut off the engine when it is not desirable to do so.

This application is a continuation in part of my previous application, Serial Number 117,101, filed Dec. 21, 1936.

An object of my invention as above intimated is to provide a safety device which automatically cuts off ignition current to the engine in order to prevent the occurrence of fires when the vehicle gets into an accident. In order to accomplish this result, provision is made for cutting off the current both when the vehicle overturns and when it is subjected to collision without overturning of the vehicle.

The novel features which I believe to be characteristic of my invention are set forth with particularity in the appended claims. The invention itself, however, both as to its organization and method of operation, together with additional objects and advantages thereof will be best understood from the following description of a specific embodiment when read in connection with the accompanying drawing in which,—

Fig. 1 is a view of the device in vertical section on the line 1—1 of Fig. 3.

Fig. 2 is a view in horizontal section on the line 2—2 of Fig. 1.

Fig. 3 is an elevational view of the device showing it attached to a fixed part of a vehicle.

Fig. 3a is a detail view on the line 3a—3a of Fig. 3.

Fig. 4 is a wiring diagram view showing the incorporation of the device in the ignition circuit of an internal combustion engine.

Referring to the particular embodiment of the device shown in the drawing for illustrative purposes, I provide a receptacle which consists of two members 10 and 12. The member 10 forms a mercury well and at its upper end is provided with an externally threaded neck 14 containing a passageway 16. The member 12 is provided with a closure 17 and forms a chamber for receiving the mercury when the vehicle overturns and this member consists of a cylindrical upper wall 18 joined to an inclined bottom wall 20 which slopes inwardly to a cylindrical wall 21 which is internally threaded to receive the threaded neck 14. The inner portion of the inclined wall 20 is provided with grooves 22 which extend laterally and with grooves 24 which extend longitudinally, the grooves 22 and 24 being disposed at right angles to each other. These grooves may be formed in the material of the inclined wall 20 or may be formed by insets placed therein.

Two spaced terminals 26 and 28 for providing a switch device extend up into the member 10 through the bottom thereof. The members 10 and 12 may be made of any suitable material. In case the member 10 is not made of insulating material such as Bakelite or glass, then it will be understood as a matter of course that the terminals 26 and 28 must be insulatively mounted. As shown in the drawing, the member 12 is provided with an arm 30 by which it may be secured to a fixed part such as the dash D of the vehicle.

As shown in Fig. 4, the safety switch device is in the ignition circuit between the battery B and the ammeter A, the battery being connected to the terminal 26 by a wire 32, and the terminal 28 being connected to one side of the ammeter by a wire 34, there being provision for connecting the other side of the ammeter to the ignition coil in the customary manner. However, it is apparent that during the manufacture of new vehicles, the safety switch device might be embodied in the ignition coil.

As shown in Fig. 3, I may attach a rod 36 at one end to a fixed part of the vehicle such as the engine block. The other end of this rod is spaced slightly from the member 10 containing the mercury so as to be adjacent thereto. When the vehicle is in a collision without being overturned, the projecting end of the rod 36 will strike the mercury well 10 and break it off thereby cutting off the ignition.

The operation and advantages of my device will now be readily understood in connection with the foregoing description and the accompanying drawing. In case the vehicle should overturn either sidewise, forwardly or backwardly, the mercury in the mercury well 10 flows quickly through one of the grooves into the member 12 and away from the terminals 26 and 28 thus breaking the ignition circuit from the battery and preventing the gasoline or liquid fuel from igniting and setting fire to the vehicle. In this connection, it should be remembered, that motor vehicles usually turn over so unexpectedly and quickly that the driver does not have time to turn off the ignition. In case the vehicle runs off the road and upsets without severe collision, then when the vehicle is righted, the switch immediately closes, and the engine is ready to be started as soon as the driver operates the starter S. However in case of collision accompanied with breaking of the mercury well, before the engine can be started, either the mercury well must be replaced or the wires 32 and 34 temporarily connected together. The character of the grooves 22 and 24 serves to calibrate the switch device for size and length of vehicles. For different wheel bases, width and height of cars and trucks, the grooves may be varied and their slant changed so that the contact of the mercury with the terminals 26 and 28 will be broken at the exact time the vehicle begins to topple over. It will be understood as a matter of course that when the engine is not running, there is no high voltage and no igniting factor to cause fires being started.

By referring to Fig. 3a, it will be seen that the end of the rod 36 is not only closely adjacent the lower reduced bottom of the mercury well but also encircles this reduced bottom for substantially one-half the distance around it. When the motor vehicle gets into a severe collision with another vehicle or with a fixed object such as a tree, pole or wall, the engine to which the rod is attached is shoved backwardly. This causes the rod to break the mercury well, regardless of whether the collision is head on or somewhat to either side, due to the curved end of the rod adjacent the mercury well.

I claim:

1. In a device of the character described, the combination of a receptacle for containing mercury in the lower portion thereof, a closure for the top of said receptacle, and two spaced terminals in an electric circuit extending through the bottom of said receptacle into the interior thereof, said receptacle between its top and bottom having an inner wall surface inclined downwardly and inwardly and provided with a number of circumferentially disposed grooves also inclined downwardly and inwardly through the lowermost one of which the mercury flows out of contact with said terminals when said receptacle is turned over in any direction.

2. In a device of the character described, the combination of a receptacle consisting of an upper and a lower member connected by a passageway, a closure for the top of said upper member, said lower member being normally partly filled with mercury, and two spaced terminals in an electric circuit extending through the bottom of said lower member into the interior thereof, said upper member having an inner bottom wall surface inclined downwardly and inwardly and provided with a number of circumferentially disposed grooves through the lowermost one of which the mercury flows out of contact with said terminals when said receptacle is turned over in any direction.

3. In a device of the character described, the combination of a receptacle consisting of an upper and a lower member, a downward internally threaded tubular extension projecting from the lower end of said upper member, an externally threaded neck projecting upwardly from said lower member engaged with the threads of said downward extension, said neck containing a reduced passageway, and two spaced terminals in an electric circuit extending through the bottom of said lower member into the interior thereof, said upper member having an inner bottom wall surface inclined downwardly and inwardly and provided with a number of circumferentially disposed grooves through the lowermost one of which the mercury flows out of contact with said terminals when said receptacle is turned over in any direction.

WILLIAM A. GROSS.